United States Patent
Fujii et al.

(10) Patent No.: US 7,133,242 B2
(45) Date of Patent: Nov. 7, 2006

(54) MAGNETIC DISK DRIVE AND MAGNETIC DISK DRIVE CONTROL

(75) Inventors: Yoshikatsu Fujii, Kanagawa-ken (JP); Sadahiro Nishida, Kanagawa-ken (JP); Osamu Beppu, Kanagawa-ken (JP); Shinji Matsushita, Kanagawa (JP); Hidefumi Tominaga, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/138,244

(22) Filed: May 25, 2005

(65) Prior Publication Data

US 2006/0203375 A1   Sep. 14, 2006

(30) Foreign Application Priority Data

Mar. 8, 2005   (JP) .............................. 2005-064034

(51) Int. Cl.
G11B 21/02 (2006.01)
G11B 5/596 (2006.01)

(52) U.S. Cl. ..................................... 360/75; 360/78.04
(58) Field of Classification Search .................... None
See application file for complete search history.

(56) References Cited

U.S. PATENT DOCUMENTS 6,643,088 B1 * 11/2003 Kawachi ...................... 360/75
6,920,007 B1 * 7/2005 Tominaga et al. ............ 360/75
2004/0080858 A1 * 4/2004 Suzuki ......................... 360/75

FOREIGN PATENT DOCUMENTS

JP   2001-143228   5/2001

* cited by examiner

Primary Examiner—Andrew L. Sniezek
(74) Attorney, Agent, or Firm—Townsend and Townsend and Crew LLP; Patrick Duncan

(57) ABSTRACT

Embodiments of the invention provide a magnetic disk drive and magnetic disk drive control method for unloading a head safely with a simple configuration when a positioning control signal cannot be detected due, for instance, to a seek error. In one embodiment, when a head cannot detect servo information prerecorded on a disk, a positioning control section resets and starts a time counting section, and switches to an unloading control section for causing the unloading control section to output a position control signal to a VCM driver. The time counting section counts tachopulses generated by a motor driver, and outputs time information. The unloading control section receives the time information from the time counting section. In accordance with the received time information, the unloading control section computes the position control signal that the positioning control section outputs to the VCM driver. In this instance, the unloading control section controls the VCM driver to provide such an electrical current profile that the drive current to be supplied to a VCM is small at an initial stage and large at a later stage.

20 Claims, 5 Drawing Sheets

MAGNETIC DISK DRIVE AND MAGNETIC DISK DRIVE CONTROL

CROSS-REFERENCES TO RELATED APPLICATIONS

This application claims priority from Japanese Patent Application No. JP2005-064034, filed Mar. 8, 2005, the entire disclosure of which is incorporated herein by reference.

BACKGROUND OF THE INVENTION

The present invention relates to a magnetic disk drive that is capable of properly unloading a head when a head positioning control signal cannot be detected, and to a method for controlling such a magnetic disk drive.

A head load/unload mechanism is used in some conventional magnetic disk drives. If head positioning control cannot be exercised for some reason, such magnetic disk drives perform an unloading position to unload a head onto a ramp.

In the above unloading operation, a constant current for unloading was formerly supplied to a voice coil motor (VCM) to unload the head onto the ramp. In some cases, however, the head bounced off a stopper so that a disk was dented when the head was loaded again onto the disk.

FIG. 5 shows an example of the above head unloading operation. If a constant current is supplied to the VCM to unload the head 12 in a situation where positioning control cannot be exercised while the head 12 is at position A, which is over the disk 10 as indicated in FIG. 5, the head 12 moves over an unloading surface 16 of the ramp 14 and toward the stopper 18. The unloading surface 16 is sloped so that the head 12 needs to move up a slope when the head 12 begins to be unloaded from the disk 10 to the ramp 14. Therefore, the constant unloading current to be supplied to the VCM needs to be large enough for the head 12 to move up the slope. If the head 12 is positioned away from the ramp 14 when positioning control cannot be exercised, a high moving speed results when the head 12 reaches the ramp 14. The reason is that the acceleration time is increased due to electrical current application. Thus, the head 12 moves up the sloped unloading surface 16 at a high speed. Consequently, the speed remains high when the head 12 collides against the stopper 18 as indicated by arrow B in FIG. 5. Therefore, when the head 12, which is put in an unstable attitude due to collision, is loaded onto a landing zone D as indicated by arrow C, the head 12 may collide against the disk 10, thereby denting the disk 10.

To prevent the head 12 from colliding against the disk 10 as described above, a technology disclosed by Japanese Patent Laid-open No. 2001-143228 moves, when the power supply is shut off, the head to the ramp at a low speed by using a small current that is obtained by rectifying a counterelectromotive force, which is generated by a spindle motor, and then causes the head to move up the sloped ramp by supplying a relatively large current from a precharged capacitor. This reduces the speed at which the head collides against the stopper.

BRIEF SUMMARY OF THE INVENTION

The above conventional technology assumes that the power supply is shut off, and requires, for instance, a counterelectromotive force rectification circuit and power supply capacitor. Therefore, when head positioning control cannot be exercised due, for instance, to a seek error (according to a seek error, head positioning control signal moves to non-write area and head read signal become abnormal), there is no suggested method for properly unloading the head. Further, the employed circuit configuration is unnecessarily complicated although there is no abnormality in the system for supplying power to the VCM.

The present invention has been made to solve the above conventional problems. It is a feature of the present invention to provide a magnetic disk drive and magnetic disk drive control method for unloading the head safely with a simple configuration when a positioning control signal cannot be detected due, for instance, to a seek error.

According to one aspect of the present invention, there is provided a magnetic disk drive comprising a positioning control module for exercising head positioning control by performing an interrupt process to control the current supply to a voice coil motor in accordance with a positioning control signal prerecorded on a disk; a time counting module for starting a time counting operation when the positioning control signal cannot be detected; and an unloading control module for unloading a head by controlling the current supply from the positioning control module to the voice coil motor over a plurality of steps in accordance with an output from the time counting module. The positioning control signal becomes undetectable due to a seek error.

The time counting module measures time by counting phase change pulse signals for a spindle motor that drives a disk.

In accordance with an output from the time counting module, the unloading control module performs an unloading operation by supplying current I1 to the voice coil motor for time T1 after the start of time counting, and then performs an unloading operation by supplying current I2, which is larger than current I1, to the voice coil motor after an elapse of time T1. Current I2 is large enough for the head to become unloaded onto a ramp.

According to another aspect of the present invention, there is provided a magnetic disk drive control method comprising the steps of exercising head positioning control by performing an interrupt process to control the current supply to a voice coil motor in accordance with a positioning control signal prerecorded on a disk; starting a time counting operation when the positioning control signal cannot be detected; and unloading the head by controlling the current supply to the voice coil motor over a plurality of steps in accordance with the time counting operation.

According to an embodiment of the present invention, it is possible to minimize the amount of head bounce from a stopper when the positioning control signal cannot be detected due, for instance, to a seek error. Consequently, it is possible to prevent a disk from being dented. As a result, the present invention enhances the reliability of a magnetic disk drive.

DETAILED DESCRIPTION OF THE INVENTION

An embodiment of the present invention will now be described with reference to the accompanying drawings.

Figure 1:
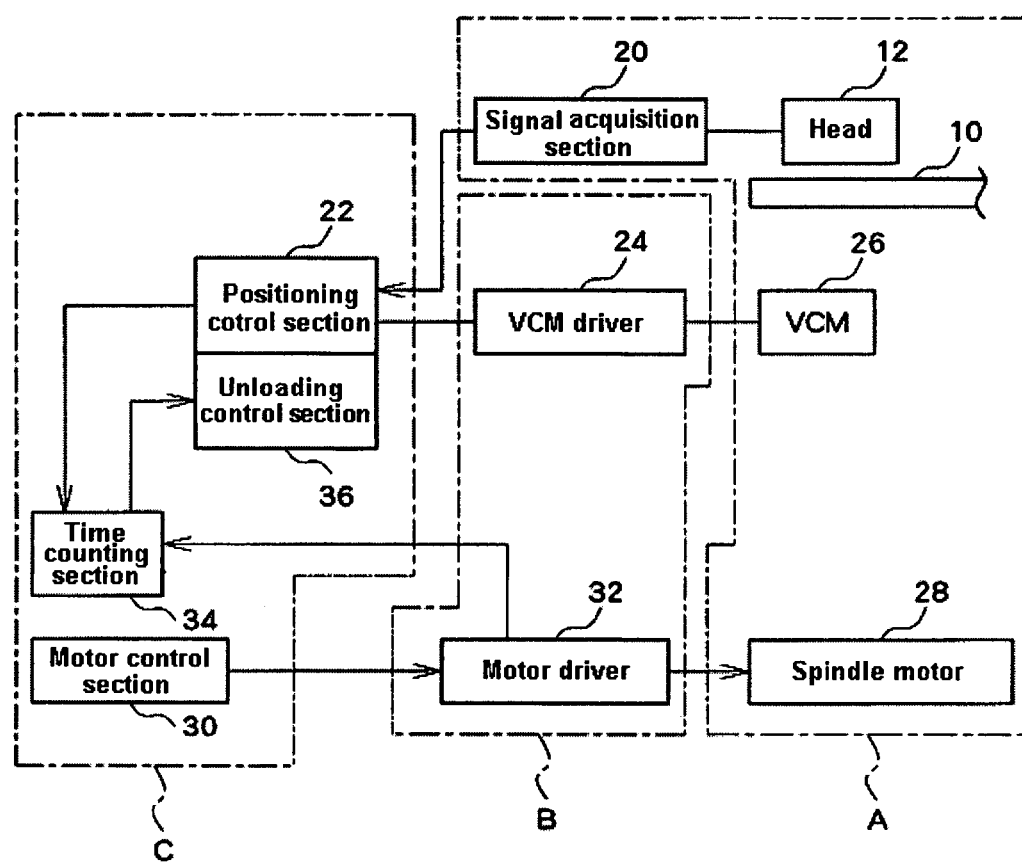
FIG. 1 is a block diagram illustrating the configuration of a magnetic disk drive according to an embodiment of the present invention.

FIG. 1 is a block diagram illustrating the configuration of a magnetic disk drive according to an embodiment of the present invention. A disk 10, head 12, signal acquisition section (preamplifier) 20, VCM 26, and spindle motor 28 are enclosed in housing A, which is a head disk assembly (HDA). Housing B contains a combo driver LSI, which incorporates the functions of a VCM driver 24 and motor driver 32. Housing C contains an MPU that implements a positioning control section 22, unloading control section 36, time counting section 34, and motor control section 30 by means of a program. Housings B and C are mounted on an electrical circuit board that is named "PCBA."

Referring to FIG. 1, servo information is prerecorded on the disk 10 as a positioning control signal. The head 12 reads the servo information. The signal acquisition section 20 effects predefined conversion. The resulting converted information enters the positioning control section 22. In accordance with the servo information, the positioning control section 22 outputs a position control signal to the VCM driver 24. In accordance with the position control signal, the VCM driver 24 supplies a drive current to the VCM 26 to exercise positioning control over the head 12. The positioning control section 22 and VCM driver 24 constitute the positioning control module according to the present invention.

The spindle motor 28, which rotates the disk 10, is subjected to rotation speed control by the motor driver 32, which is controlled by the motor control section 30. More specifically, the motor control section 30 monitors the intervals of a phase change signal (tacho-pulse signal), which is fed from the motor driver 32, to determine the rotation speed of the spindle motor 28. The motor control section 30 computes a control output in accordance with the rotation speed of the spindle motor 28. The motor driver 32 converts the computed control output into a three-phase alternating current. The three-phase alternating current is then supplied to the spindle motor 28 to exercise rotation speed control.

When the servo information, which serves as the head positioning control signal, cannot be detected by the head 12 so that the signal acquisition section 20 does not enter the servo information into the positioning control section 22, the positioning control section 22 resets and starts the time counting section 34, and switches to the unloading control section 36 for causing the unloading control section 36 to output a position control signal to the VCM driver 24. In this instance, the time counting section 34 counts the tacho-pulses that are generated by the motor driver 32, and outputs time information.

The time information, which is used for head positioning control purposes, is generated from the servo information that is detected by the head 12. Therefore, if the servo information cannot be detected, the time information for head positioning control disappears. However, the time counting section 34 generates the time information from the tacho-pulses as described above. The tacho-pulses are generated as long as the spindle motor 28 is driven. Therefore, the time information is not lost even when the head 12 cannot detect the servo information.

A seek error or other similar error occurs when the servo information cannot be detected because, for instance, the head 12 is moved to an area above the disk 10 where the servo information is not written or a head's servo information detection mechanism is inoperative.

Figure 2:
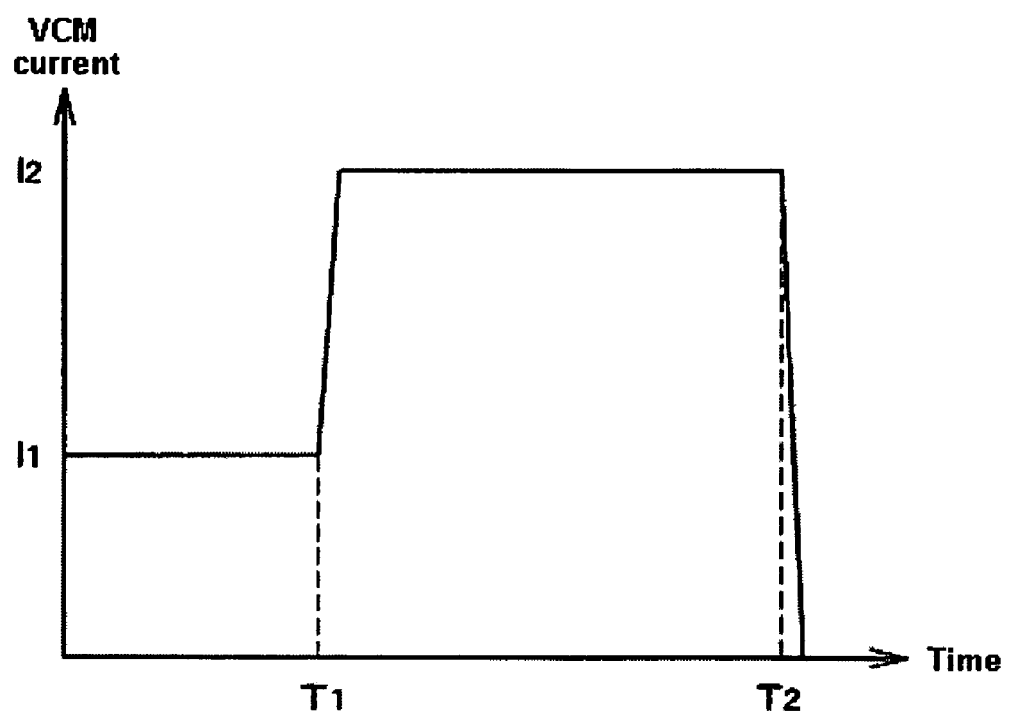
FIG. 2 shows a typical electrical current profile of a VCM that is controlled by an unloading control section shown in FIG. 1.

The unloading control section 36 receives a time information output from the time counting section 34. In accordance with the received information, the unloading control section 36 computes the position control signal, which is to be output from the positioning control section 22 to the VCM driver 24. In this instance, the unloading control section 36 controls the VCM driver 24 so that the drive current to be supplied to the VCM 26 is an electrical current profile involving a plurality of steps. FIG. 2 shows a typical electrical current profile of the VCM 26, which is controlled by the unloading control section 36. Referring to FIG. 2, the head 12 is unloaded by supplying predetermined current I1 to the VCM 26 for predetermined time T1 after the time counting section 34 is reset and started due to a servo information detection failure. After an elapse of time T1, the head 12 is further unloaded by supplying current I2, which is larger than current I1, to the VCM 26. Although the profile shown in FIG. 2 is such that the electrical current value changes over two steps, the present invention is not limited to such a profile. An alternative profile may be such that currents I1 and I2 vary with time.

Figure 3:
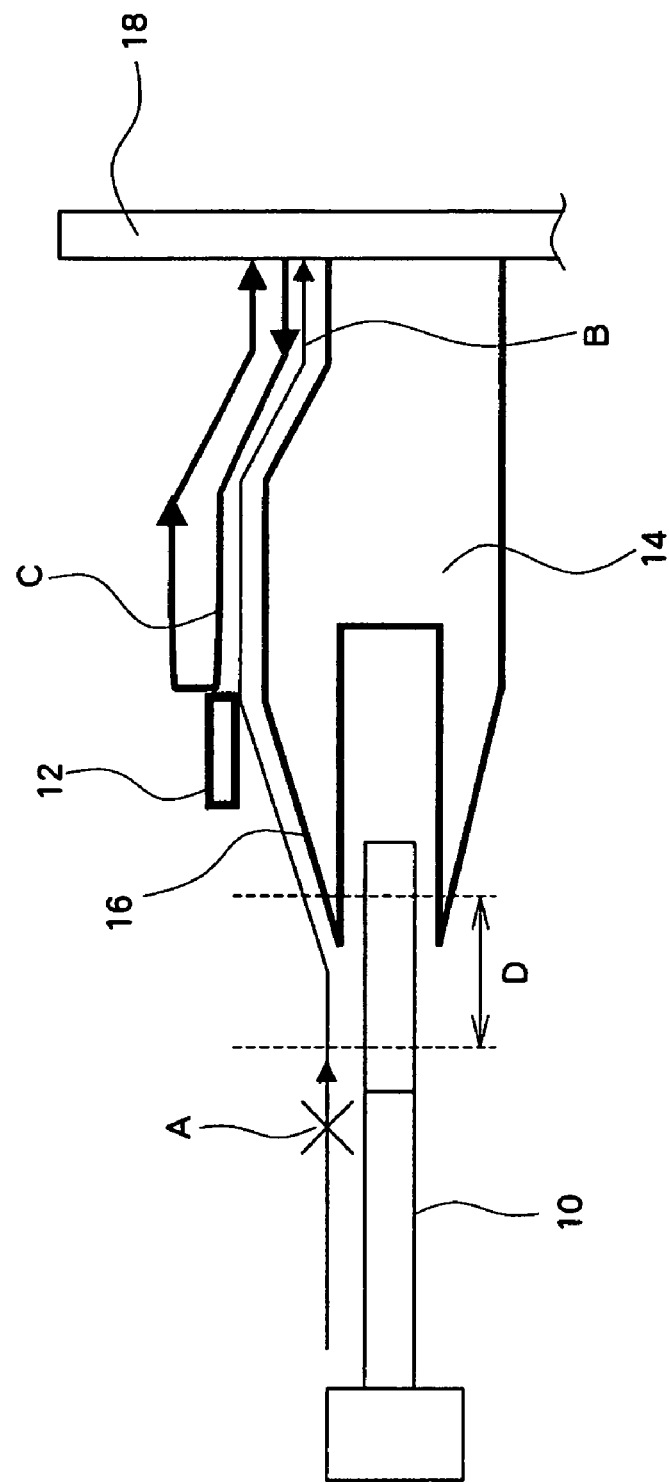
FIG. 3 shows an example in which a head is unloaded when a VCM is driven in accordance with the electrical current profile shown in FIG. 2.

FIG. 3 shows an example in which the head 12 is unloaded when the VCM 26 is driven in accordance with the electrical current profile shown in FIG. 2. Referring to FIG. 3, if a current is supplied to the VCM 26 in accordance with the above electrical current profile in a situation where positioning control cannot be exercised while the head 12 is placed at position A, which is above the disk 10, current I1 causes the head 12 to move toward the ramp 14 for time T1. Time T1 is set so that the head 12 can return to the ramp 14 when the head 12 is positioned at the maximum distance from the ramp 14, which is used for unloading. Current I1 is for moving the head 12 toward the ramp 14. However, current I1 is smaller than a current that is required when the head 12 moves up the sloped unloading surface 16 of the ramp 14.

When time T1 elapses, the head 12 reaches the ramp 14. Therefore, current I2, which is larger than current I1, is then supplied to the VCM 26. Current I2 is set to a value that is required when the head 12 moves up the sloped unloading surface 16. The head 12 then moves up the sloped unloading surface 16 and reaches the stopper 18 as indicated by arrow B in FIG. 3. In the present embodiment, the VCM 26 is driven by a small current (I1) before the head 12 reaches the ramp 14. Therefore, the head 12 does not increase its speed. Further, the head 12 stops before it begins to move up the sloped unloading surface 16 because current I1 is not large enough for the head 12 to move up the sloped unloading surface 16. Consequently, the speed at which the head 12 collides against the stopper 18 is low. Further, the amount of head bounce from the stopper can be rendered small as indicated by arrow C in FIG. 3. Therefore, the head 12 does not bounce back to the landing zone D of the disk 10. As a result, it is possible to prevent the disk 10 from being dented.

Current I2 is supplied to the VCM 26 for predetermined time T2 after the time counting section 34 is reset and started. After an elapse of time T2, the current supply to the VCM 26 is set to zero as indicated in FIG. 2. In this instance, the head 12 is unloaded to the stopper 18.

Table 1 below shows typical values of time T1, time T2, current I1, current I2. The unloading control section 36 references a table that is prerecorded in a flash ROM and indicated in Table 1, and controls the aforementioned unloading operation of the head 12. The values indicated in the table are illustrative only. Appropriate values are used in accordance, for instance, with the magnetic disk drive model.

TABLE 1

| T1 | 16 ms | I1 | 80 mA |
|----|-------|----|-------|
| T2 | 200 ms | I2 | 250 mA |

Figure 4:
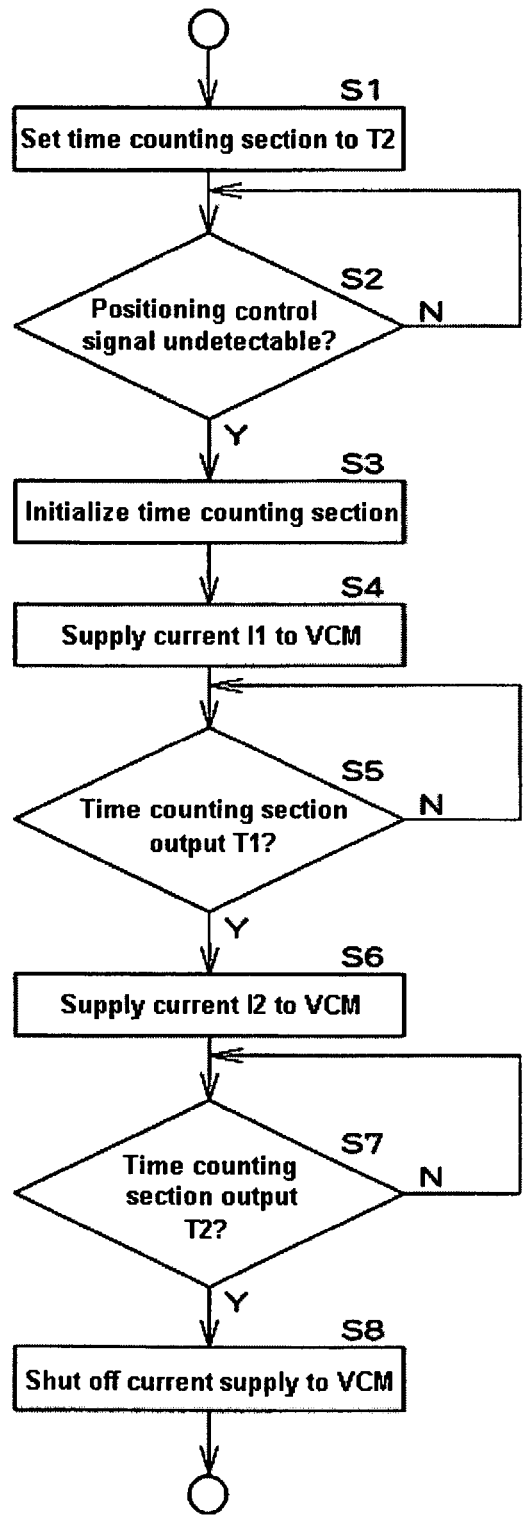
FIG. 4 is a flowchart illustrating a magnetic disk drive control method according to one embodiment of the present invention.
Figure 5:
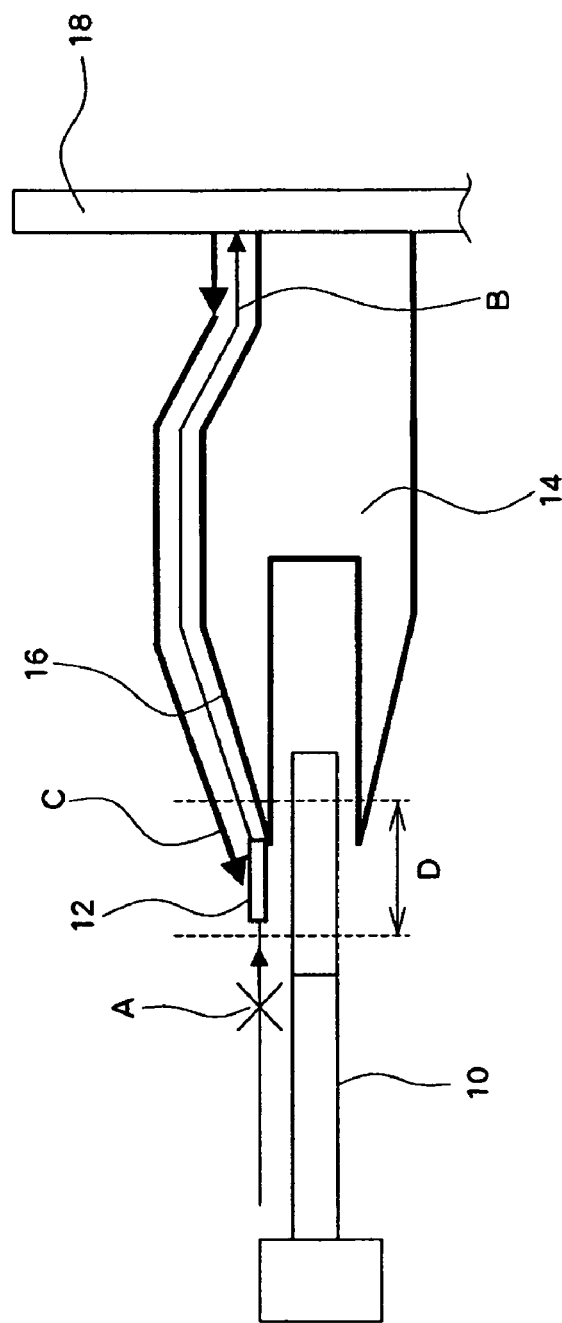
FIG. 5 shows an example of a conventional head unloading operation.

FIG. 4 is a flowchart illustrating a magnetic disk drive control method according to the present embodiment, which has been described above. Referring to FIG. 4, the time counting section is set to T2 until the servo information becomes undetectable (step S1). The control output from the unloading control section 36, which is a current, is then reduced to zero as indicated by an electrical current profile in FIG. 2. This ensures that the positioning control section 22 does not interfere with head positioning control.

When the servo information becomes undetectable (step S2), the positioning control section 22 initializes (resets and starts) the time counting section 34, and switches to the unloading control section 36 for causing the unloading control section 36 to output a position control signal to the VCM driver 24.

The unloading control section 36 performs current value setup so that current I1 is supplied from the VCM driver 24 to the VCM 26 (step S4), and checks whether the time count output from the time counting section 34 is T1 (step S5).

When the time count output from the time counting section 34 is T1 in step S5, the unloading control section 36 performs current value setup so that current I2 is supplied from the VCM driver 24 to the VCM 26 (step S6), checks whether the time count output from the time counting section 34 is T2 (step S7).

When the time count output from the time counting section 34 is T2 in step S7, the unloading control section 36 turns off the current value so that no current is supplied from the VCM driver 24 to the VCM 26 (step S8). The head unloading operation is then completed.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   positioning control means for exercising head positioning control by performing an interrupt process to control the current supply to a voice coil motor in accordance with a positioning control signal prerecorded on a disk;
   time counting means for starting a time counting operation when said positioning control signal cannot be detected; and
   unloading control means for unloading a head by controlling the current supply from said positioning control means to said voice coil motor over a plurality of steps in accordance with an output from said time counting means.

2. The magnetic disk drive according to claim 1, wherein said positioning control signal becomes undetectable due to a seek error.

3. The magnetic disk drive according to claim 2, wherein said time counting means measures time by counting phase change pulse signals for a spindle motor that drives a disk.

4. The magnetic disk drive according to claim 3, wherein, in accordance with an output from said time counting means, said unloading control means performs an unloading operation by supplying current I1 to said voice coil motor for time T1 after the start of time counting, and then performs an unloading operation by supplying current I2, which is larger than current I1, to said voice coil motor after an elapse of time T1.

5. The magnetic disk drive according to claim 4, wherein current I2 is large enough for a head to be unloaded onto a ramp.

6. The magnetic disk drive according to claim 1, wherein, in accordance with an output from said time counting means, said unloading control means performs an unloading operation by supplying current I1 to said voice coil motor for time T1 after the start of time counting, and then performs an unloading operation by supplying current I2, which is larger than current I1, to said voice coil motor after an elapse of time T1.

7. The magnetic disk drive according to claim 6, wherein current I2 is large enough for a head to be unloaded onto a ramp.

8. The magnetic disk drive according to claim 1, wherein said time counting means measures time by counting phase change pulse signals for a spindle motor that drives a disk.

9. A magnetic disk drive comprising:
   a positioning control module configured to exercising head positioning control by performing an interrupt process to control the current supply to a voice coil motor in accordance with a positioning control signal prerecorded on a disk;
   a time counting module configured to start a time counting operation when said positioning control signal cannot be detected; and
   an unloading control module configured to unload a head by controlling the current supply from said positioning control module to said voice coil motor over a plurality of steps in accordance with an output from said time counting module.

10. The magnetic disk drive according to claim 9, wherein said positioning control signal becomes undetectable due to a seek error.

11. The magnetic disk drive according to claim 9, wherein said time counting module measures time by counting phase change pulse signals for a spindle motor that drives a disk.

12. The magnetic disk drive according to claim 11, wherein, in accordance with an output from said time counting module, said unloading control module performs an unloading operation by supplying current I1 to said voice coil motor for time T1 after the start of time counting, and then performs an unloading operation by supplying current I2, which is larger than current I1, to said voice coil motor after an elapse of time T1.

13. The magnetic disk drive according to claim 12, wherein current I2 is large enough for a head to be unloaded onto a ramp.

14. The magnetic disk drive according to claim 9, wherein, in accordance with an output from said time counting module, said unloading control module performs an unloading operation by supplying current I1 to said voice coil motor for time T1 after the start of time counting, and then performs an unloading operation by supplying current I2, which is larger than current I1, to said voice coil motor after an elapse of time T1.

15. The magnetic disk drive according to claim 14, wherein current I2 is large enough for a head to be unloaded onto a ramp.

16. A magnetic disk drive control method, comprising:
exercising head positioning control by performing an interrupt process to control the current supply to a voice coil motor in accordance with a positioning control signal prerecorded on a disk;
starting a time counting operation when said positioning control signal cannot be detected; and
unloading a head by controlling the current supply to said voice coil motor over a plurality of steps in accordance with said time counting operation.

17. The magnetic disk drive control method according to claim 16, wherein said positioning control signal becomes undetectable due to a seek error.

18. The magnetic disk drive control method according to claim 16, wherein the time counting operation comprises measuring time by counting phase change pulse signals for a spindle motor that drives a disk.

19. The magnetic disk drive control method according to claim 16, wherein unloading the head comprises, in accordance with an output from said time counting operation, supplying current I1 to said voice coil motor for time T1 after the start of time counting, and then performs an unloading operation by supplying current I2, which is larger than current I1, to said voice coil motor after an elapse of time T1.

20. The magnetic disk drive control method according to claim 19, wherein current I2 is large enough for a head to be unloaded onto a ramp.

* * * * *